United States Patent [19]
Losenno et al.

[11] Patent Number: 5,839,623
[45] Date of Patent: Nov. 24, 1998

[54] REUSABLE PRESSURE SPRAY CONTAINER

[75] Inventors: Christopher D. Losenno; Gino L. Losenno, both of Edina; William M. Mower, Plymouth, all of Minn.

[73] Assignee: Pure Vision International, L.L.P., Minneapolis, Minn.

[21] Appl. No.: 688,657

[22] Filed: Jul. 29, 1996

[51] Int. Cl.⁶ .................................................. B65D 83/00
[52] U.S. Cl. ................................ 222/402.1; 222/402.18; 222/386.5
[58] Field of Search .......................... 222/95, 105, 386.5, 222/387, 389, 402.1, 183, 402.16, 402.18

[56] References Cited

U.S. PATENT DOCUMENTS

| | | |
|---|---|---|
| 3,169,670 | 2/1965 | Hrebenak et al. ........................ 222/95 |
| 3,559,701 | 2/1971 | Wittersheim . |
| 3,583,606 | 6/1971 | Ewald ................................ 222/402.18 |
| 3,592,390 | 7/1971 | Morse . |
| 3,675,825 | 7/1972 | Morane ............................... 222/402.18 |
| 3,792,802 | 2/1974 | Gores . |
| 3,827,608 | 8/1974 | Green . |
| 3,838,796 | 10/1974 | Cohen . |
| 3,901,416 | 8/1975 | Schultz . |
| 4,147,284 | 4/1979 | Mizzi . |
| 4,482,082 | 11/1984 | Goncalves . |
| 4,513,890 | 4/1985 | Goncalves . |
| 4,619,297 | 10/1986 | Kocher . |
| 4,646,947 | 3/1987 | Stull . |
| 4,813,575 | 3/1989 | O'Connor . |
| 4,921,020 | 5/1990 | Pamper . |
| 4,925,066 | 5/1990 | Rosenbaum . |
| 4,984,717 | 1/1991 | Burton . |
| 5,165,576 | 11/1992 | Hickerson . |
| 5,224,528 | 7/1993 | Helmut et al. . |
| 5,507,420 | 4/1996 | O'Neill . |
| 5,695,096 | 12/1997 | Yquel ................................. 222/402.18 |

*Primary Examiner*—Andres Kashnikow
*Assistant Examiner*—David Deal
*Attorney, Agent, or Firm*—Haugen and Nikolai, P.A.

[57] ABSTRACT

Spray bottle dispensers for liquid products featuring, in the case of a first embodiment, a refillable and rechargeable container especially designed so that the product being dispensed does not come into contact with working parts of the valve structure, thus obviating problems due to gum-up. In an alternate embodiment, loss of the propellant (compressed air) through the container wall is prevented by using a first compliant walled container for the product to be dispensed and a second compliant wall container as a liner.

8 Claims, 6 Drawing Sheets

REUSABLE PRESSURE SPRAY CONTAINER

BACKGROUND OF THE INVENTION

I. Field of the Invention

This invention relates generally to spray bottle product dispensing apparatus, and more particularly to a pressurized container in which the pressurizing fluid is isolated from the product to be dispensed as a spray until the moment of release and in which the valving mechanism employed is effectively isolated from the product to avoid gumming/clogging thereof.

II. Discussion of the Prior Art

Spray bottle dispensers are commonly used to dispense a variety of products. Such things as paints, furniture polishes, lubricants, cleaning compounds, etc. are routinely packaged in such a way that the contents of the package can be released as an aerosol spray. One well-known form of spray dispenser includes a bottle containing an unpressurized liquid product to be dispensed that is arranged to be sealed with a bottle cap incorporating a plunger pump, which when reciprocally actuated by thumb pressure, draws the product through a tube and out a pin-hole orifice to generate a spray. The quality of the spray is dependent upon the thumb pressure employed and, as a result, there tends to be a lack of uniformity in the aerosol flow rate.

A more convenient, but more environmentally unfriendly aerosol dispenser is of the type that uses as a propellant a chlorofluorocarbon or other volatile organic compounds used to pressurize the interior of a non-refillable, throwaway metal container. Depression of a push-button valve projecting out from the top of the container allows the pressurized mixture to exit the valve as an aerosol spray.

Hair sprays used to hold hair in place generally comprise a lacquer dissolved in alcohol. In the past, it has been possible to utilize sufficient alcohol in the formulation to ensure that the lacquer is adequately diluted so that it would not tend to congeal and thereby render the release valve mechanism inoperative. Recent changes in federal regulations dictate that the amount of alcohol used in such aerosol dispensers be less than 55 percent by volume. Adherence to this regulation renders many prior art spray bottle designs unworkable for use with Hair sprays, especially where the valving structures are exposed to the product being dispensed. Thus, a need exists for a dispenser capable of delivering such low alcohol formulation materials as a fine spray to enhance quicker drying.

In my copending application Ser. No. 327,705, filed Oct. 24, 1994, (now U.S. Pat. No. 5,623,974) there is described an aerosol dispenser system designed to use pressurized air as a propellant and the container described in that application includes provision for periodic refilling of the container with the spray product and for repressurizing the container from a compatible air pump. In that earlier device, the spray product formulation is not isolated from the pressurizing fluid and, as a result, there tends to be an attendant loss in air pressure due to mixing of the propellant gas with the liquid product, requiring more frequent pressurization.

SUMMARY OF THE INVENTION

The invention comprises a spray bottle for dispensing a liquid product through a nozzle as a fine, uniform mist or aerosol. It comprises an outer container having a generally closed bottom, an open top in a generally cylindrical, rigid wall extending between the closed bottom and open top. Placed within the outer container is an inner container in which the liquid product to be dispensed is contained. The inner container has a fluted, compliant body portion defining a collapsible chamber that contains the liquid product to be dispensed. The inner container is suspended from a relatively rigid valve holder member, the valve holder member including a flange structure for suspending the inner container within the wall of the outer container. A first valve assembly is fitted into a bore in the valve holder member for allowing the introduction of a pressurizing gas into a space between the compliant body of the inner container and the rigid wall of the outer container. A second valve assembly is fitted into a recess provided in the valve holder member and it is operatively coupled to the first valve assembly for selectively allowing the pressurizing gas and the liquid product to turbulently mix and flow out from a nozzle orifice on the second valve means. Completing the assembly is a cap that can be threadedly secured to the open top of the outer container for holding the valve holder member in position. The cap includes a central opening for accommodating the nozzle orifice therethrough.

The first and second valve assemblies are configured so that the interfacing surfaces thereof with the valve holder is not exposed to the liquid to be dispensed and, accordingly, clogging or sticking of the movable parts does not occur.

DESCRIPTION OF THE DRAWINGS

The foregoing features as well as other features and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENTS

Figure 1:
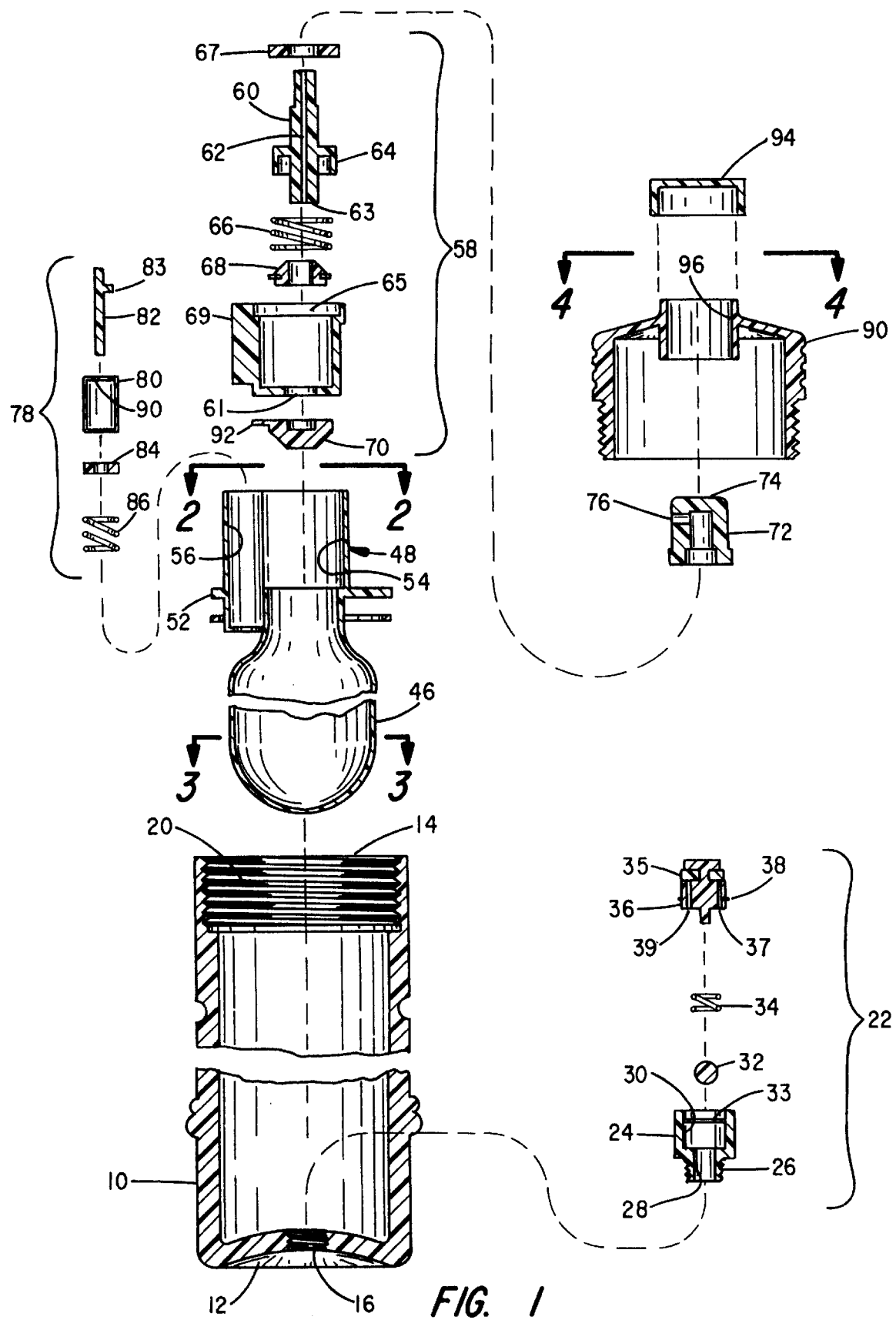
FIG. 1 is an exploded, cross-sectional view of a spray bottle comprising a first preferred embodiment, clearly showing the individual parts and their cooperation.

Referring first to FIG. 1, there is shown an exploded, longitudinally cross-sectioned view of a spray bottle comprising a first preferred embodiment of the invention. This spray bottle is designed to be refillable and rechargeable. It is seen to include a molded plastic bottle 10 formed generally as a right circular cylinder having a generally closed bottom 12 and an open top 14. The bottom 12 is slightly concaved inward and includes an integrally formed, centrally located threaded bore 16. The open top 14 surrounds an internally threaded neck portion 20.

With no limitation intended, the bottle 10 may be about 6½ in. high and have an outside diameter of about 1⅝ in. with a wall thickness of about ¼ in. The bottle may be molded from a variety of different plastics, including polyethylene, polypropylene, nylon and others. Screwed into the threaded bore 16 in the base or bottom 12 of the bottle 10 is a check valve assembly indicated by bracket 22. It includes a valve housing 24 having an externally threaded stem 26 adapted to mate with the internal threads of the bore 16 in the bottle. The stem 26 includes a central bore 28 leading to a counterbore 30. A ball-type check valve 32 fits into the counterbore and cooperates with the shoulder between the bore 28 and the counterbore 30 to form an air-tight seal. A coil spring 34 is disposed between the ball check valve member 32 and a molded plastic spring retainer 36. The spring retainer has an annular protuberance 38 that is adapted to snap into the annular grove 33 formed in the wall of counterbore 30 of housing 24. The spring retainer 36 includes a plurality of tiny bores as at 37 and 39 extending longitudinally therethrough and normally overlayed and covered by an elastomeric washer 35.

Adapted to fit through the threaded open upper end 20 of the bottle 10 is a container 46 in which the liquid product to be sprayed is contained. The container 46 comprises an elongated, tubular body having relatively thin, compliant walls. For example, and with no limitation intended, the container 46 may be formed in a blow molding operation from a variety of plastics so as to have a wall thickness in the range of from about 0.005–0.007 in. and is, thus, readily collapsible under pressure. Located at the upper end of the container 46 is a valve holder member 48. The valve holder member 48 may be integrally molded with the container 46, but is of a substantially greater wall thickness so as to be generally rigid and non-compliant.

Figure 2:
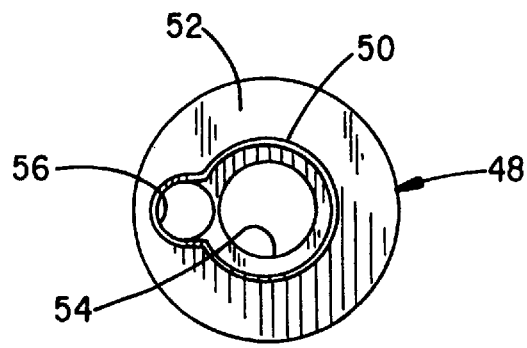
FIG. 2 is a top view of the inner container when viewed along the lines 2—2 in FIG. 1.
Figure 3:
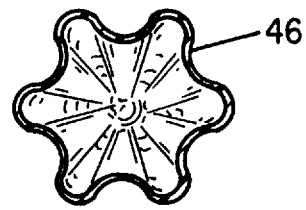
FIG. 3 is a cross-sectional view taken along the line 3—3 in FIG. 1.

Referring to FIG. 2, which shows a top view of the valve holder member 48, it comprises a generally cylindrical wall 50 having a radially extending flat circular flange 52 extending outwardly therefrom. Located within the cylindrical wall 50 is a first, inwardly and downwardly tapered valve receiving socket 54. Located laterally adjacent the first valve receiving socket 54 is a second valve receiving socket 56 having straight or vertical side walls. A first valve means shown enclosed by bracket 58 is adapted to fit within the socket 54 in the valve holder means 48.

The first valve means comprises a tubular valve stem 60 having a lumen 62 extending the length thereof. Projecting radially outwardly from the outer wall of the valve stem 60 is a cup-shaped flange 64 that is an integral part of the valve stem itself. The cup-shaped flange 64 is adapted to receive and provide a stop for a compression spring 66 which is dimensioned to slide onto the lower portion of the valve stem 60. Also slidingly fitted onto the lower end portion of the valve stem 60 is an elastomeric valve member 68. It includes a central longitudinal bore dimensioned so that the part 68 may slide onto the lower portion of the valve stem 60. The valve elements 60, 66 and 68 are designed to fit within a molded plastic housing member 69 and held in place by an annular plate 67 that is bonded in place in cylindrical recess 65 formed in the upper end of the housing 69. The lower end 63 of the valve stem 60 projects through a circular opening 61 in the base of housing member 69 and a mating elastomeric valve element 70 that snaps onto the lower end of the valve stem 60 with a tight friction fit. As in my earlier U.S. Pat. No. 5,623,974, a flow path in the form of a fine notch (not shown) in the base of the valve stem 60 will allow fluid under pressure to reach the lumen 62.

Figure 4:
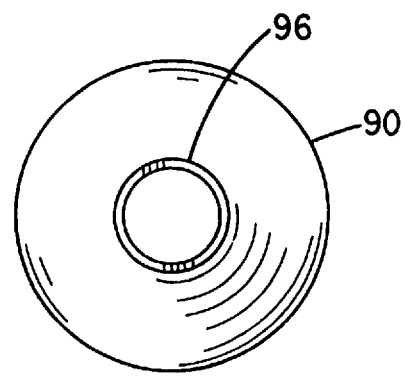
FIG. 4 is a top view of the cap member taken along the line 4—4 in FIG. 1.
Figure 4A:
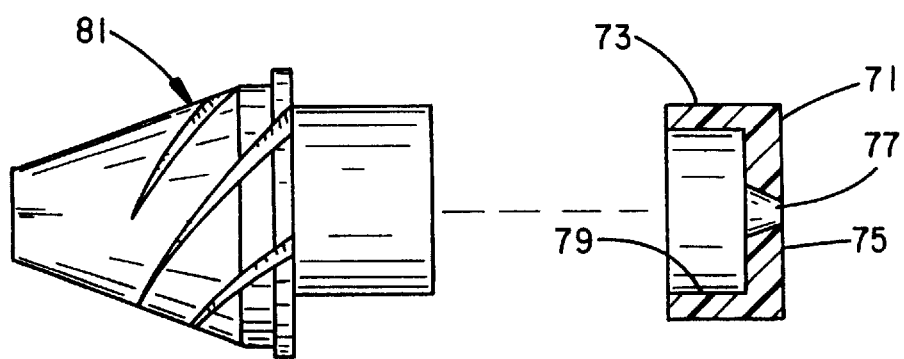
FIG. 4A is a greatly enlarged view of a valve nozzle insert.

Fitted onto the upper end of the valve stem 60 is a nozzle member 72. Its upper surface 74 is adapted to be engaged by the user's thumb or forefinger to depress same. The height dimension of the housing member 69 is such that the valve element 70 does not occlude the central opening of the valve receiving socket 54 (FIG. 2) when the assembly 58 is depressed in the socket and the nozzle member 72 is depressed. Formed in the side of the nozzle member 72 is an orifice 76. Fitted into that orifice is a nozzle insert that is shown in greatly enlarged form in FIG. 4A.

The nozzle insert is identified by numeral 71 and is generally cylindrical in form, having a circular side wall 73 and an integrally formed end wall 75. Formed in the end wall is a precision pin-hole orifice 77 that diverges from a smaller dimension at its outlet to a larger dimension where it intersects with the chamber 79 defined by wall 73.

Also forming a part of the nozzle assembly is a turbulator 81 which fits within the nozzle housing 72 and which is in fluid communication with the outlet end of the lumen 62 of valve stem 60. The turbulator 81 has a plurality of spiral grooves formed in the side surface thereof for imparting a tornado type spin to the pressurized fluid before it exits the nozzle orifice 77, thereby creating a very fine mist with only minuscule droplets as the spray.

Fitted into the second valve holder socket 56 of the valve holder member 48 is a second valve member shown enclosed by bracket 78. It includes a cylindrical valve housing 80 dimensioned to fit into the socket 56. Extending longitudinally through the valve housing 80 is a valve stem 82. Surrounding the stem is a radially extending elastomeric washer-like valve element 84 that cooperates with the upper end of the housing 80 to seal its opening under force provided by a coiled compression spring 86.

When the first and second valve assemblies enclosed by brackets 58 and 78 are properly positioned within the sockets provided therefore in the valve holder member 48, the radially extending tab 92 of the valve member 70 overlies the finger 83 projecting from the valve stem 82 that lies outside the upper end of the housing 80. The container 46 and the valve holding member 48 are held in place by a cap 90 that is designed to be threaded into the upper threaded end 14 of the bottle 10 so as to clamp the radial flange 52 on the valve holder 48 in place.

Completing the assembly is a protective closure 94 that fits onto the wall of the cap 91 defining the central opening 96 in the top thereof, preventing actuation of the spray bottle during shipping and handling.

OPERATION—FIRST EMBODIMENT

Having described the constructional features of the first preferred embodiment of the invention, consideration will next be given to its mode of operation and, in this connection, it will be assumed that the spray bottle is intended to hold a hair spray product to be dispensed. However, many different liquid products commonly dispensed as an aerosol can be used as well. Prior to use, the bottle 10 must first be charged with a suitable propellant, preferably compressed air and, in this regard, a compressed air pump, such as that shown in my co-pending patent application Ser. No. 327,705, filed Oct. 24, 1994 (now U.S. Pat. No. 5,623,974), may be employed. The outlet nozzle of that pump will be inserted into the bore 28 of the valve housing 24 so as to displace the ball 30 against the force of the spring 34 from its seated position in the valve housing. The air pressure provided by the pump will cause air to flow through the ports 37 and 39 of the valve stem 36 and will lift the elastomeric valve member 35, allowing the air to fill the space between the walls of the bottle 10 and the container 46. The resulting pressurization of this chamber will result in forces acting on the thin-walled, compliant container 46 holding the liquid to be dispensed. The pressure also acts on the valve member 84 to cause it to seat tightly against the valve seat 90 formed on the upper end of valve housing 80. Hence, there will be no loss of pressure due to air flow through the valve assembly identified by bracket 78.

Once the interior of the bottle 10 is fully pressurized to a desired pressure of approximately 30 psi, the spray bottle is ready for use. The removal of the bottle from the pump allows the ball valve 32 to reseat and the pressure in the container tightly seals the ports 37 and 39. Upon removal of the closure 94 from the cap 91, the push-button 72 becomes accessible. By pushing down on the push-button 72, the tab 92 on the valve member 70 cooperates with the finger 83 on valve stem 82 causing the valve member 84 to be displaced from its valve seat 90 allowing a quantity of pressurized air contained within the chamber of the bottle 10 to mix with the liquid being squeezed out of the compliant container 46 with the resultant air/liquid mixture being forced upward through the lumen 62 of the valve stem 60 and ultimately out through the pin-hole orifice 76 formed in the side of the push-button 72. More particularly, depression of the valve stem 60 pushes the valve 70 away from its sealed condition with the lower end of the housing 69 allowing the product from the container 46 to mix with the pressurizing gas in that gap before flowing up the lumen 62 and out the nozzle 76.

Upon release of finger pressure on the surface 74 of the push-button 72, the valve stem again rises, lifting the tab 92 of the valve member 70 from its engagement with the finger 83 on the valve stem 82 of the valve 78, again shutting off any flow of air through the valve 78. At the same time, due to the force of spring 66, valve member 70 will seat against the underside of valve housing 69, preventing any flow of liquid from the container 46 through the lumen 62 of the valve stem 60.

It can be appreciated that between uses, the container 10 can be repressurized from the air pump (not shown). Furthermore, the inner container 46, when empty, can be removed from the outer container 10 by unscrewing the cap 94 and lifting it out. The valve housing 69 can then be removed from the socket in valve holder 48. A replacement cartridge identical to that illustrated, but filled with product to be dispensed, can now be inserted as a replacement following reinstallation of the valve assembly 58 therein.

SECOND EMBODIMENT

The above-described embodiment is intended for professional use by barbers and beauticians and, for this reason, that embodiment is designed to accept replacement cartridges filled with product to be dispensed and is further designed to be repressurized from an external pump. The invention may also be applied for retail sale directly to consumers for household use. This alternative embodiment is depicted in FIGS. 5–9 of the drawings.

Figure 5:
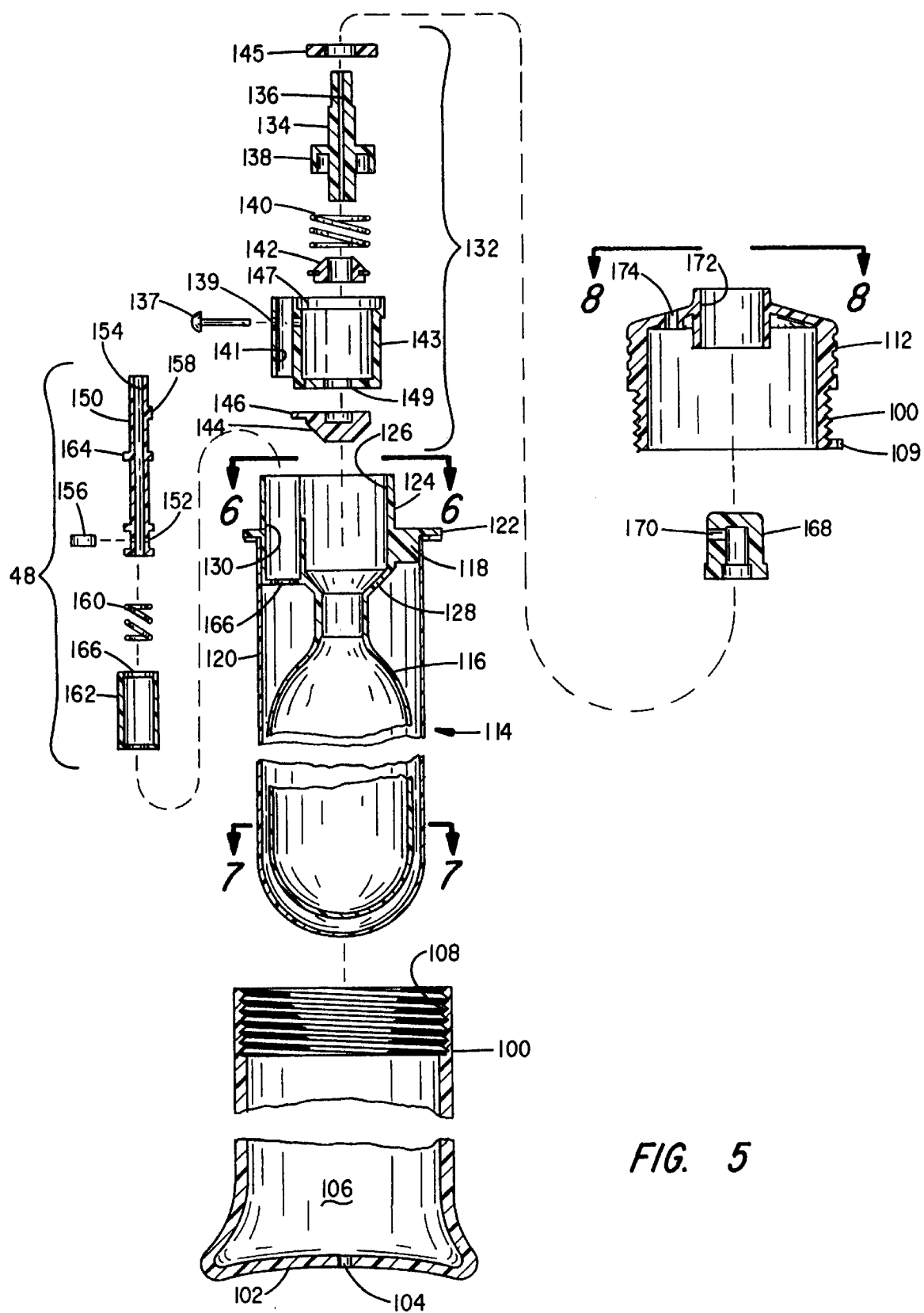
FIG. 5 is an exploded, cross-sectional view of a spray bottle comprising a second preferred embodiment.
Figure 6:
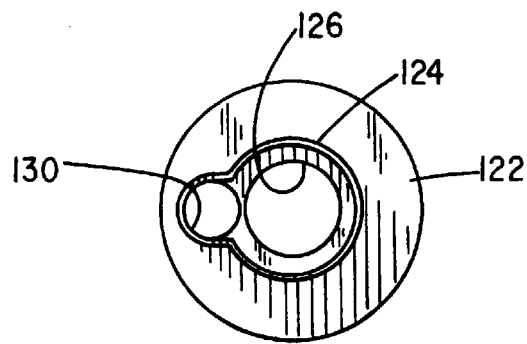
FIG. 6 is a top view of the inner container taken along the line 6—6 in FIG. 5.
Figure 7:
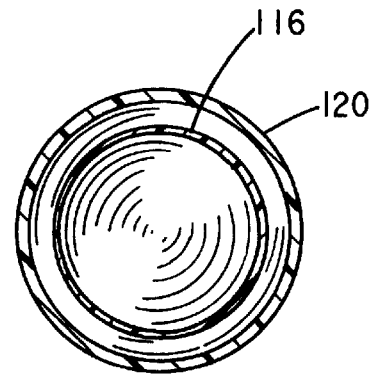
FIG. 7 is a cross-sectional view taken along the line 7—7 in FIG. 5.
Figure 8:
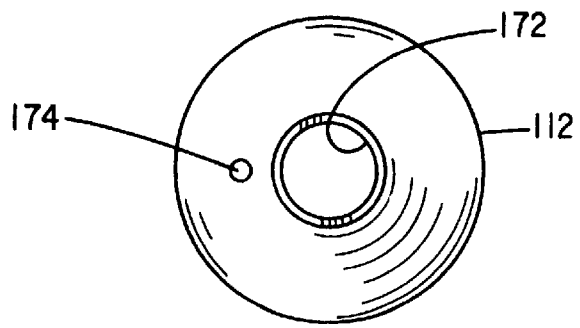
FIG. 8 is a top view of the cap assembly taken along the line 8—8 in FIG. 5.

Referring first to the exploded, sectioned view of FIG. 5, it is seen to include a relatively thin-walled (as compared to the professional model), rigid, molded plastic bottle or container 100 that is generally in the form of a right circular cylinder, but which has a somewhat flared base for improved stability. The outer bottle or container 100 has a generally closed bottom 102, save for a small bore 104 that extends through the wall defining the base to the interior chamber 106. The top of the outer container 100 is provided with internal threads as at 108 for mating with external threads 110 formed on a cap member 112.

A cartridge, indicated generally by numeral 114, is adapted to drop into the outer container or bottle 100 through its open top. The cartridge 114 is seen to include an elongated inner container 116 that has thin, compliant walls so as to be compressible. This inner container may be integrally molded with a valve holder segment 118. The valve holder segment has somewhat thicker walls and is, therefore, relatively rigid and non-compliant. The inner container is filled at the factory with the product to be dispensed as an aerosol spray. Surrounding the inner container 116 is an air-impervious elastomeric expandable barrier member 120 that has its upper open end bonded to the exterior walls of the valve holder member 118 so as to be air tight, thus defining a space or volume between it and the container 116 enclosed thereby.

The valve holder member is substantially identical in its configuration to that used in the professional model depicted in FIG. 1 and, as such, it includes a radially extending circular flange 122 surrounding a cylindrical wall 124 that defines a first valve receiving socket 126 having a tapered base 128. Disposed adjacent the first valve receiving socket 126 is a second valve receiving socket 130.

The first valve receiving socket 126 is adapted to contain the valve assembly shown enclosed by bracket 132. The valve assembly includes a tubular valve stem 134 having a lumen 136 extending the full length thereof and integrally molded with the valve stem is a cup-shaped spring retainer 138 into which the upper end of a compression spring 140 is adapted to fit. Slidingly received on the lower end of the valve stem 134 is an elastomeric valve member 142. The valve elements 134, 140 and 142 are designed to fit within a housing member 143 and are held in place by an annular disk 145 that is bonded in place in a counterbore or cavity 147 formed in the upper end of housing member 143. The lower end of valve stem 134 projects through the central opening of an annular disk insert 149, and below that is a mating valve member 144 that attaches with a friction-fit to the bottom end of the valve stem 134. As in the embodiment of FIG. 1, a fine L-shaped notch (not shown) is formed in the base of valve stem 134 and cooperates with the bore in valve 144 to create a flow path leading to lumen 136. The valve member 144 includes a radially extending finger 146. The housing member 143 includes a longitudinal bore 141.

The second valve receiving socket 130 is adapted to receive the valve assembly identified by bracket 148 therein. This valve assembly is similar to the assembly identified by bracket 78 in the embodiment of FIG. 1 but differs therefrom in that the valve stem 150 is longer and is tubular in configuration, whereas the valve stem 82 in FIG. 1 is solid and does not have a lumen extending the length thereof. Valve stem 150 is dimensioned to freely pass through the bore 141 in the housing member 143 upon its insertion into the valve holder 124.

Figure 9:
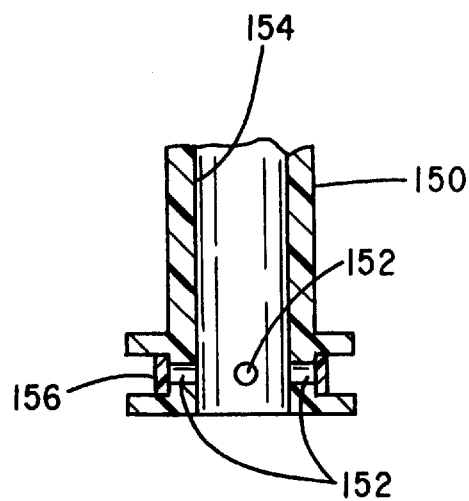
FIG. 9 is an enlarged view of a portion of the inflation valve stem used in the embodiment of FIG. 5.

Looking at the enlarged partial view of the valve stem 150 illustrated in FIG. 9, disposed near the lower end of the valve stem are a plurality of radial ports, as at 152, that extend through the side wall of the valve stem so as to be in fluid communication with the lumen 154 of the valve stem 150. An extensible, elastomer band 156 is fitted over the valve stem to overlay and normally seal the ports 152. Projecting radially from the valve stem a measured predetermined distance below its upper end is a finger 158 which, as will be explained in greater detail below, is designed to cooperate with the tab 146 on the valve member 144. A coil spring 160 is designed to fit into a tubular housing 162 having openings formed in opposite ends thereof and the spring cooperates with the valve stem 154 to normally urge it in an upward direction as viewed in FIG. 5. Midway up the length of the valve stem 154 is an elastomeric seal member 164 affixed to it and it cooperates with the annular wall 166 formed on the upper end of the second valve housing member 162 to normally seal that opening.

Frictionally fitted onto the upper tapered end of the valve stem 134 of the valve assembly enclosed by brackets 132 is a nozzle member 168 substantially identical to that used on the embodiment of FIG. 1 having a pin-hole orifice 170 in fluid communication with the lumen 136 of the valve stem member 134. The nozzle member 168 is dimensioned to fit through a cylindrical opening 172 that is formed in the upper surface of the cap 112 when the cap is screwed in place in the upper end of the bottle 100. The cap 112 also has a bore 174 formed therethrough that is aligned with the lumen 154 of the valve stem 150 which projects upwardly through the central opening in the upper end of the housing member 162 contained in the second valve receiving socket 130 of valve holding member 124.

A slot 139 is formed through the sidewall of the valve housing member 143 and inserted, and retained therein is a lock member 137 that is designed to cooperate with the valve stem 134 to limit its extent of travel when depressed to dispense the product. When the container is empty of product, the lock member 137 can be removed from the slot 139 to permit a greater travel of the valve stem. The increased travel creates a larger opening between seal element 164 and its seat 166 such that the gas pressure remaining in the container can be released prior to disposal of the container.

OPERATION—SECOND EMBODIMENT

As mentioned earlier, the embodiment of the invention depicted in FIGS. 5–9 is intended for home use by the ultimate consumer and, for that reason, is not designed to be refillable nor be repressurized. At the factory, the inner container 116 is filled with the liquid product and inserted through the first valve receiving socket 126 prior to insertion of the valve assembly 132 into that valve receiving socket. The filled cartridge 114 is then placed within the outer container or bottle 100, the valve assemblies shown enclosed by brackets 132 and 148 are then inserted into the respective valve receiving sockets 126 and 130 and the cap 112 is screwed in place onto the upper end of the bottle. To prevent later disassembly of the spray container, suitable provisions may be made for permitting only one-way rotation of the cap 112 relative to the threaded end 108 of the bottle 100. For example, a flexible barb 109 may be integrally molded on the lower end of the cap 110 such that it will flex outwardly beyond the lowermost thread 108 of the bottle 100.

To reduce cost of manufacture, the walls of the bottle 100 are appreciably thinner than in the professional model depicted in FIG. 1 of the drawings. Because of the relative thinness of the walls 100, pressurized air can permeate those walls and, for that reason, the cartridge assembly 114 includes the outer air-impervious bladder or sleeve 120. To pressurize the container, a tubular needle, much like that used to inflate a football, is inserted through the opening 174 in the cap 110 and into the lumen 154 of the valve stem 150. Air from a suitable pump is forced through the hollow needle, causing the elastomeric band 156 covering the ports 152 at the base of the valve stem 150 to expand and allowing air to pass through the ports 152 and into the space between the elastomeric sleeve 120 and the compliant walls of the container 116. When a suitable pressure has been reached, the needle is removed and the elastic band 156 contracts to again seal about the ports 152, preventing escape of the pressurize air therethrough. The pressure within the elastomeric sleeve or bladder 120 exerts a compressive force against the elastomeric valve 164, sealing it tightly against the wall defining the opening 166 formed in the base of the second valve receiving socket 130. It also exerts a compressive force on the container 116, tending to cause the liquid product to be dispensed to exit the throat area of the container 116. However, at this time, the product is blocked from flowing through the lumen 136 of the valve stem 134 and out the nozzle opening 170 by the cooperation of the spring-biased seal member 142 and the mating seal member 144 with the disk insert 149.

At the time of use by the ultimate consumer, the push-button nozzle 168 is depressed, forcing the valve stem 134 and the valve member 144 downward and allowing the liquid in the container 116 under pressure to flow into the lumen 136 of the valve stem. At the same time, the downward movement of the valve member 144 brings the tab 146 on it into engagement with the finger 158 on the valve stem 150, thus causing the valve stem 150 to be displaced. The seal member 164 thereon is likewise displaced downward, thereby permitting pressurized air to escape through the opening 166 and to mix with the liquid to be dispensed, in the gap or zone between the valve 144 and its seat before progressing up the lumen 136 and creating a "tornado" effect within the nozzle assembly so that the air/liquid mixture exits the orifice 170 as a fine spray.

Upon release of the push-button nozzle 168, the spring 140 again forces the valve member 142 into engagement with the valve seat 149 to thereby block liquid flow from the pressurized compliant walled container 116. At the same time, the tab 146 on the valve member 144 disengages from the finger 158, again allowing the valve member 164 to rise and thereby sealingly engage with the opening or aperture 166 formed in the upper end of the valve housing member 162 contained in the valve receiving socket 130, preventing escape of the pressurized air.

As in both of the embodiments of FIGS. 1 and 5, the liquid to be dispensed is shielded from the springs employed in the valve assemblies, thereby preventing clogging and failure even though the solvent, such as alcohol, is less than 55 percent by volume of the solution being dispensed.

It can also be observed that with the embodiments disclosed herein, the formulation to be dispensed is isolated from the pressurizing fluid (air) until just prior to release through the nozzle in that the product to be dispensed is contained within an internal bladder. This has the salutary effect of preventing loss of pressure by virtue of the propellant mixing with the liquid product as in prior art pressurized spray containers. Where the propellant gas is exposed to the liquid product, a quantity blends or mixes with the product, and no longer is available to drive the product from the container. By utilizing a compliant walled, liquid/gas impervious membrane, as at 46 in FIG. 1 and 116 in FIG. 5, to isolate the propellant from the product, this loss of pressurization is obviated.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A spray bottle for dispensing a liquid product as an aerosol, comprising:
   (a) an outer container having a generally closed bottom, an open top and a generally cylindrical, rigid, wall extending therebetween;
   (b) an inner container for containing the liquid product, the inner container having a compliant body portion defining a collapsible chamber, said inner container being supported from a relatively rigid valve holder member, the valve holder member including means for suspending the inner container within the wall of the outer container;
   (c) first valve means for allowing the introduction of a pressurizing gas into a space between said compliant body of the inner container and the rigid wall of the outer container;
   (d) second valve means for selectively allowing the pressurizing gas and the liquid product to mix and flow out from a nozzle orifice on the second valve means as an aerosol; and
   (e) a cap secured to the open top of the outer container, the cap including a bore for receiving the nozzle orifice therethrough while holding the valve holder assembly in place.

2. The spray bottle as in claim 1 wherein the valve holder member includes a first port in fluid communication with the collapsible chamber and a second port in fluid communication with a space between the inner container and the wall of the outer container.

3. The spray bottle as in claim 2 wherein the second valve means includes a pair of valve members, one of the pair of valve members being disposed in cooperation with the first port in a normal fluid blocking relation and the other of the pair of valve member being disposed in cooperation with the second port in normal fluid blocking relation and wherein actuation of the one of the pair of valve members also actuates the other of the pair of valve members to permit mixing of the pressurizing gas and the liquid product prior to exiting the nozzle orifice.

4. The spray bottle as in claim 1 wherein the first valve means is disposed in the generally closed bottom of the outer container.

5. The spray bottle as in claim 1 wherein the pressurizing gas is compressed air.

6. The spray bottle as in claim 2 and further including an intermediate container having a compliant body supported form the valve holder member and enclosing the inner container.

7. The spray bottle as in claim 6 wherein the first valve means is disposed in the second port of the valve holder member in fluid communication with a space between the inner container and the intermediate container.

8. The spray bottle as in claim 7 wherein the first valve means comprises a tubular valve stem having a lumen extending the length thereof on which is affixed an elastomeric seal member adapted to seat against the second port, the tubular valve including a side port leading to the lumen and an extensible elastomeric band disposed about the valve stem in covering relation to the side port.

* * * * *